United States Patent [19]

Genesco

[11] Patent Number: 4,578,938

[45] Date of Patent: Apr. 1, 1986

[54] RAKE ATTACHMENT FOR A ROTARY POWER MOWER

[76] Inventor: Vernon D. Genesco, 5323 Miles Grant J105, Stuart, Fla. 33494

[21] Appl. No.: 761,874

[22] Filed: Aug. 2, 1985

[51] Int. Cl.⁴ ............................................. A01D 34/52
[52] U.S. Cl. ...................... 56/295; 56/13.4; 56/16.9; 56/400
[58] Field of Search ............... 56/16.4, 16.7, 16.9, 56/193, 371, 13.4, 400, 400.21; 172/42, 271

[56] References Cited

U.S. PATENT DOCUMENTS

| | | | |
|---|---|---|---|
| 2,969,634 | 1/1961 | Lannert | 56/13.4 |
| 3,117,633 | 1/1964 | Hosek | 56/295 |
| 3,184,903 | 7/1973 | Tonjes, Jr. | 56/193 |
| 3,742,688 | 5/1965 | Fjelstad | 56/295 |
| 3,918,242 | 5/1981 | Wolf | 56/295 |
| 4,269,020 | 11/1975 | Harris | 56/16.7 |

Primary Examiner—Robert P. Swiatek
Assistant Examiner—David L. Tarnoff
Attorney, Agent, or Firm—Norman B. Rainer

[57] ABSTRACT

A device adapted to temporarily replace the standard cutting blade of a rotary power mower enables the thus modified power mower to function in a manner to rake debris from a lawn. The raking effect can be achieved at low rotational speed of the mower. The device is comprised of an elongated support plate which mounts upon the lower extremity of the mower's vertically disposed drive shaft, and two rake arms adjustably attachable to the extremities of the support plate to provide an overall length of the device equal to the cutting blade it replaces. The rake arms are provided with a series of resilient fingers angled away from the support plate and terminating in a line diagonal to the center longitudinal axis of said support plate.

5 Claims, 2 Drawing Figures

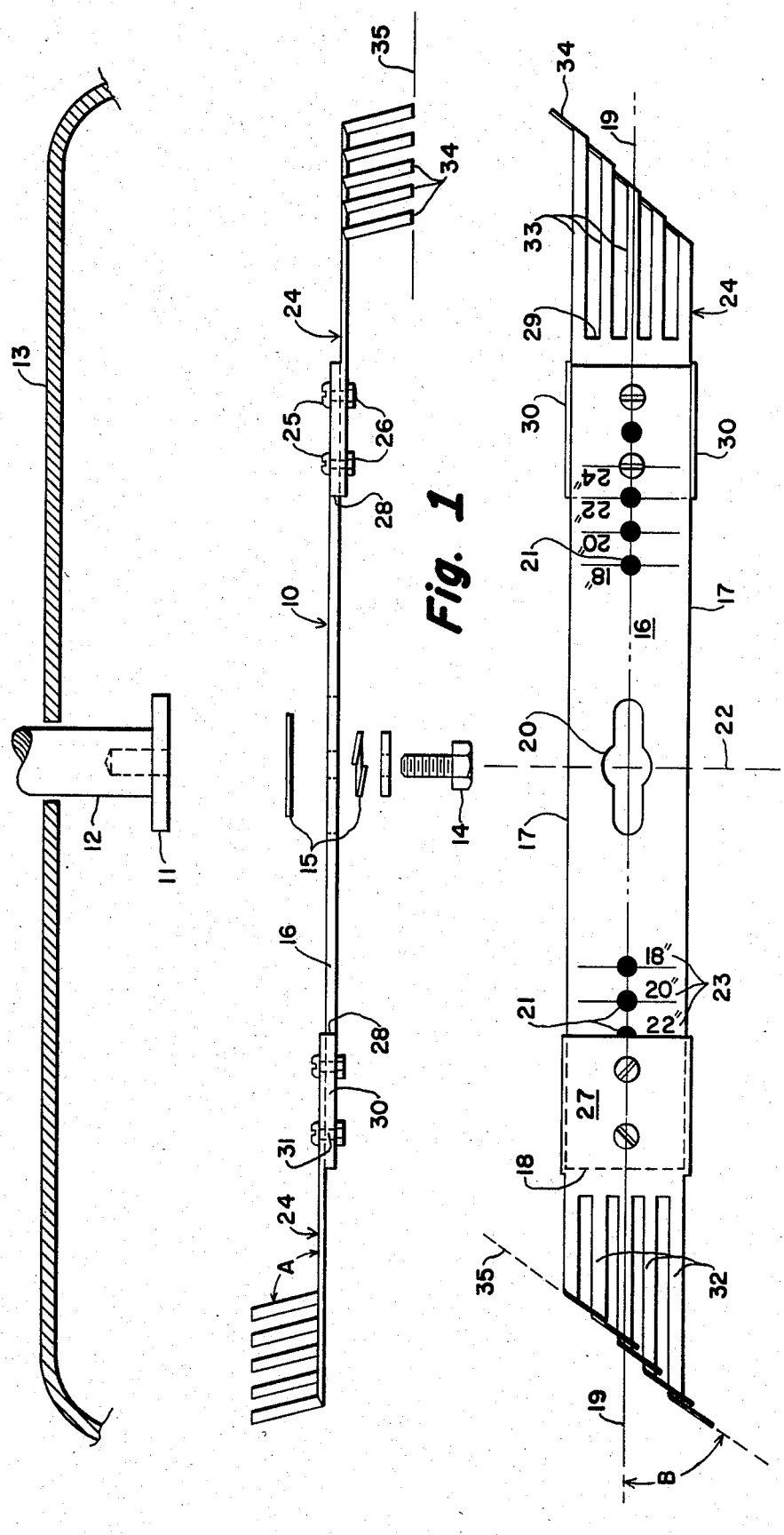

RAKE ATTACHMENT FOR A ROTARY POWER MOWER

BACKGROUND OF THE INVENTION

This invention concerns an attachment for a rotary power mower, and more particularly relates to an attachment intended to replace the normal cutting blade of a rotary mower, thereby imparting to said mower the ability to rake leaves and grass trimmings.

Rotary power mowers, generally driven by a gasoline-powered engine are in widespread use for the cutting of lawn grasses to a selected uniform height. It is well known to equip such mowers with collecting means which capture and retain grass cuttings, leaves or other debris, said capture being achieved by virtue of entrainment of the debris in the airstream generated by the rapidly rotating blade of the mower.

In attempts to adapt the power mower to other tasks, modifications have been disclosed enabling the mower to mulch leaves and to remove accumulated grass cuttings and leaves, generally called thatch, from the ground in which the grass is rooted. In such mower modifications, however, the mulched leaves or thatch is deposited upon the grass, and necessitates a separate raking operation. Cutting, mulching and thatch-removal operations required high power levels which are generally produced by high rotational speed of the mower blade. Not only does the high power level consume increased quantities of gasoline, but the high speed of the blade engenders safety problems. Furthermore, in the case of thatch-removing devices, the metal prongs generally utilized are susceptible to breaking at high rotational speeds, such broken parts becoming dangerous missiles.

Lawn sweeper devices have been disclosed which recover and accumulate lawn debris for convenient disposal. However, such specialized equipment and its requisite storage facilities add to the cost of lawn maintenance.

It is accordingly an object of the present invention to provide an attachment for a rotary power mower which will enable said mower to accumulate lawn debris at a low rotational speed.

It is another object of this invention to provide an attachment as in the foregoing object which temporarily replaces the rotary blade of the mower and adjustably fits mowers of various sizes.

It is a further object of the invention to provide an attachment of the aforesaid nature which imparts a rake-like capability to said mower whereby lawn debris is collected at a relatively low power requirement.

It is still another object of the present invention to provide a raking attachment for a rotary power mower of simple and rugged construction which may be economically manufactured.

These objects and other objects and advantages of the invention will be apparent from the following description.

SUMMARY OF THE INVENTION

The above and other beneficial objects and advantages are accomplished in accordance with the present invention by a raking device adapted to be removably attached to the lowermost extremity of the drive shaft of a rotary power mower in place of the cutting blade generally attached to said drive shaft, said device comprising:

(a) a support plate of elongated flat rigid construction having: (1) two straight parallel edges extending in the direction of elongation and terminating in end extremities, (2) an axis of elongation centered between said straight edges, (3) a mounting aperture centered between said extremities on said axis and adapted to removably engage the lowermost extremity of said drive shaft, (4) two series of circular attachment holes of uniform diameter disposed on said axis on each side of said mounting aperture and equidistant therefrom, (5) a first plane of symmetry which perpendicularly bisects said plate along said axis, and (6) a second plane of symmetry which perpendicularly bisects said plate at the center of said mounting aperture and disposed perpendicularly to said first plane of symmetry, (b) a pair of rake arms, each of integral monolithic construction and fabricated of a flexible material, each comprised of (1) a flat base portion having inwardly and outwardly directed extremities, two centered attachment holes, and opposed straight parallel holding flanges, and (2) a series of fingers having proximal portions which emerge from the outwardly directed extremity of said base portion as continuous and coplanar extensions thereof, and distal portions angled away from said base portions and terminating in extremities lying in a straight line locus parallel to said base portion and angled with respect to said flanges, and (c) fastening means adapted to secure said rake arms to the extremities of said support plate, said fastening means being interactive between the centered attachment holes of the base portion of the rake arms and the attachment holes of the series in said support plate, whereby (d) the rake arms are secured by said fastening means to said support plate in a manner such that (1) the rake arms are equidistantly disposed about the mounting aperture, (2) the flanges of the rake arms lie in abutment with the straight edges of the support plate, and (3) the rake arms are disposed upon opposite surfaces of the support plate such that, when the device is operatively positioned on the mower, the fingers of one rake arm are above the support plate and the fingers of the other rake arm are below the support plate.

In a preferred embodiment, the support plate will have indicia associated with the two series of attachment holes to indicate proper hole selection for attachment of the rake arms so that the device will have the same overall length as the mower blade it replaces. In further preferred embodiments, the distal portions of the fingers are bent at an angle of between 90° and 120° with respect to their respective proximal portions, and have equal lengths between 1 and 4 inches.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a side view of an embodiment of the device of this invention shown in exploded association with the drive shaft and housing of a rotary power mower.

FIG. 2 is a top view of the device of FIG. 1.

DESCRIPTION OF THE PREFERRED EMBODIMENT

Referring to FIGS. 1 and 2, a raking device 10 of the present invention is shown in association with lowermost extremity 11 of drive shaft 12 disposed below housing 13 of a rotary power mower. Standard bolt 14 and washers 15 facilitate attachment of the raking device to the drive shaft.

The raking device is comprised of elongated support plate 16 having straight parallel edges 17 extending in the direction of elongation and terminating in end extremities 18. Said support plate is characterized in having an axis of elongation 19 centered between said straight edges and parallel therewith. Mounting aperture 20, centered between extremities 18 and on axis 19, is adapted to removably engage the lowermost extremity of drive shaft 12. Two series of circular attachment holes 21 of uniform diameter are disposed along axis 19 on each side of mounting aperture 20 and equidistant therefrom.

The support plate may be further characterized in having a first plane of symmetry which perpendicularly bisects the plate along axis 19; and a second plane of symmetry, represented by line 22 in FIG. 2, which perpendicularly bisects said plate at the center of mounting aperture 20. Said first and second planes of symmetry perpendicularly intersect in a line passing through the center of mounting aperture 20. The support plate preferably has a rectangular periphery, and is fabricated of steel sheet stock of about $\frac{1}{4}''$ thickness. Inidica 23 indicate which of the holes 21 are to be utilized for the attachment of rake arms, as will hereinafter be shown, so as to fit within a given size of mower housing.

A pair of rake arms 24 are joined to the opposite extremities of the support plate by means of threaded bolts 25 and interactive nuts 26. Each rake arm is comprised of flat base portion 27 having inward extremity 28 directed toward mounting aperture 20, outwardly directed extremity 29, opposed straight holding flanges 30, and two centered attachment holes 31 positioned in a manner to align with holes 21 of the support plate, thereby permitting insertive engagement by bolts 25. The holding flanges are adapted to lie in slideable abutment with straight edges 17 of the support plate, thereby preventing movement of the bolted rake arms with respect to the support plate.

A series of fingers 32 are associated with the outwardly directed extremity 29 of each base portion 27. Each finger is comprised of a proximal portion 33 that emerges from said base portion as a continuous and coplanar extension thereof, and a distal portion 34 angled away from said proximal portion. Said distal portions terminate in a straight line locus 35 which is parallel to said base portion and angled with respect to axis 19. The angle at which the distal portions are disposed with respect to the base portion, and represented as angle A in FIG. 1, may range between 90° and 120°. The angle at which locus line 35 is disposed with respect to axis 19 is represented as angle B in FIG. 2 taken in the direction of rotation between axis 19 and locus line 35. The value of angle B may range between 40° and 80°. The direction of rotation of the device is shown by the curved arrows in FIG. 2.

The number of fingers on each rake arm may range between about four and eight. It is to be noted that the rake arms are mounted one above and one below the support plate. The rake arms, and especially the fingers thereof, have a resilient characteristic as may be secured by critically chosen geometry and materials of construction. Preferred materials of construction are plastics such as polyamides, polyacetals, polycarbonates and other engineering grade thermoplastics amendable to shaping by injection molding methods.

It has been found that the device of this invention, when driven at relatively low revolutionary speed, can lift leaves, grass cuttings and other lightweight debris within an entraining airstream, and deposit said debris in a collector bag of conventional design borne by the power mower. Alternatively, the mower equipped with the device may be utilized to accumulate lawn debris in a central pile on the lawn. This is best accomplished by traversing the lawn in a diminishing spiral pattern, whereby said debris is blown into a central pile which can then be easily disposed of.

Because of the adjustable length of the device, it may be employed with power mowers having housings of substantially any conventional size. Since the device can be quickly and easily installed onto a mower and removed therefrom, it provides the functions of two pieces of lawn maintenance equipment in a single mower. The low operational speed to be used with the raking device of this invention not only conserves energy but increases the safety of operation of the rotary mower in its converted mode of function.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A raking device for removable attachment to the lowermost extremity of a drive shaft of a rotary power mower in place of the cutting blade generally attached to said drive shaft, said device comprising:

(a) a support plate of elongated flat rigid construction having: (1) two straight parallel edges extending in the direction of elongation and terminating in end extremities, (2) an axis of elongation centered between said straight edges, (3) a mounting aperture centered between said extremities on said axis and adapted to removably engage the lowermost extremity of said drive shaft, (4) two series of circular attachment holes of uniform diameter disposed on said axis on each side of said mounting aperture and equidistant therefrom, (5) a first plane of symmetry which perpendicularly bisects said axis, and (6) a second plane of symmetry which perpendicularly bisects said plate at the center of said mounting aperture in perpendicular disposition to said first plane of symmetry, (b) a pair of rake arms, each of integral monolithic construction and fabricated of a flexible material, each comprised of: (1) a flat base portion having inwardly and outwardly directed extremities, two centered attachment holes, and opposed straight parallel holding flanges, and (2) a series of fingers having proximal portions which emerge from the outwardly directed extremity of said base portion as continuous and coplanar extensions thereof, and having distal portions angled away from said base portions and terminating in extremities lying in a straight line locus parallel to said base portion and angled with respect to said flanges, and (c) fastening means adapted to secure said rake arms to the extremities of said support plate, said fastening means being interactive between the centered attachment holes of the base portion of the rake arms and the attachment holes of the series of said support plate, whereby (d) the rake arms are secured by said fastening means to said support plate in a manner such that: (1) the rake arms are equidistantly disposed about the mounting aperture, (2) the flanges of the rake arms lie in abutment with the straight edges of the support plate, and (3) the rake arms are disposed upon opposite surfaces of the support plate such that, when the device is operatively positioned upon said drive shaft, the fingers of one rake arm are above the support plate and the fingers of the other rake arm are below the support plate.

2. The raking device of claim 1 wherein said support plate has indicia associated with the two series of attachment holes to indicate proper hole selection for attachment of the rake arms so that the device will have an overall length, measured between the most distant teeth of said rake arm, equal to the length of the mower blade it replaces.

3. The raking device of claim 1 wherein the distal portions of said fingers are bent at an angle of between 90° and 120° with respect to their respective base portions.

4. The raking device of claim 3 wherein the angle at which said straight line locus is disposed with respect to the flanges of its associated base portion is between 40° and 80° measured in the direction of rotation.

5. The raking device of claim 1 wherein the rake arms are fabricated of an engineering grade thermoplastic amendable to shaping by injection molding methods.

* * * * *